T. B. DOOLEY & H. A. SEVIGNE.
BREAD WRAPPING MACHINE.
APPLICATION FILED SEPT. 11, 1908.
1,064,964.
Patented June 17, 1913.
6 SHEETS—SHEET 1.
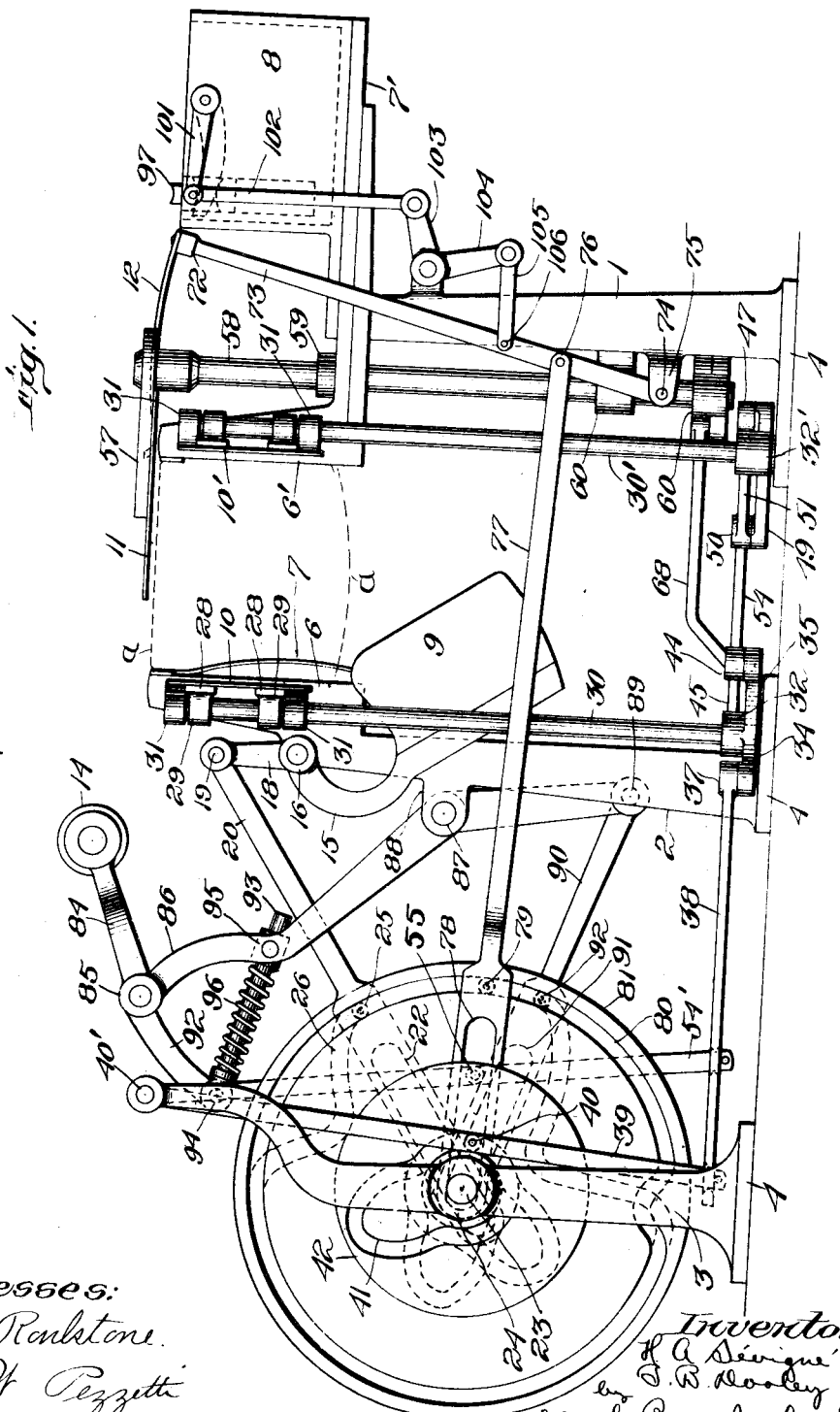

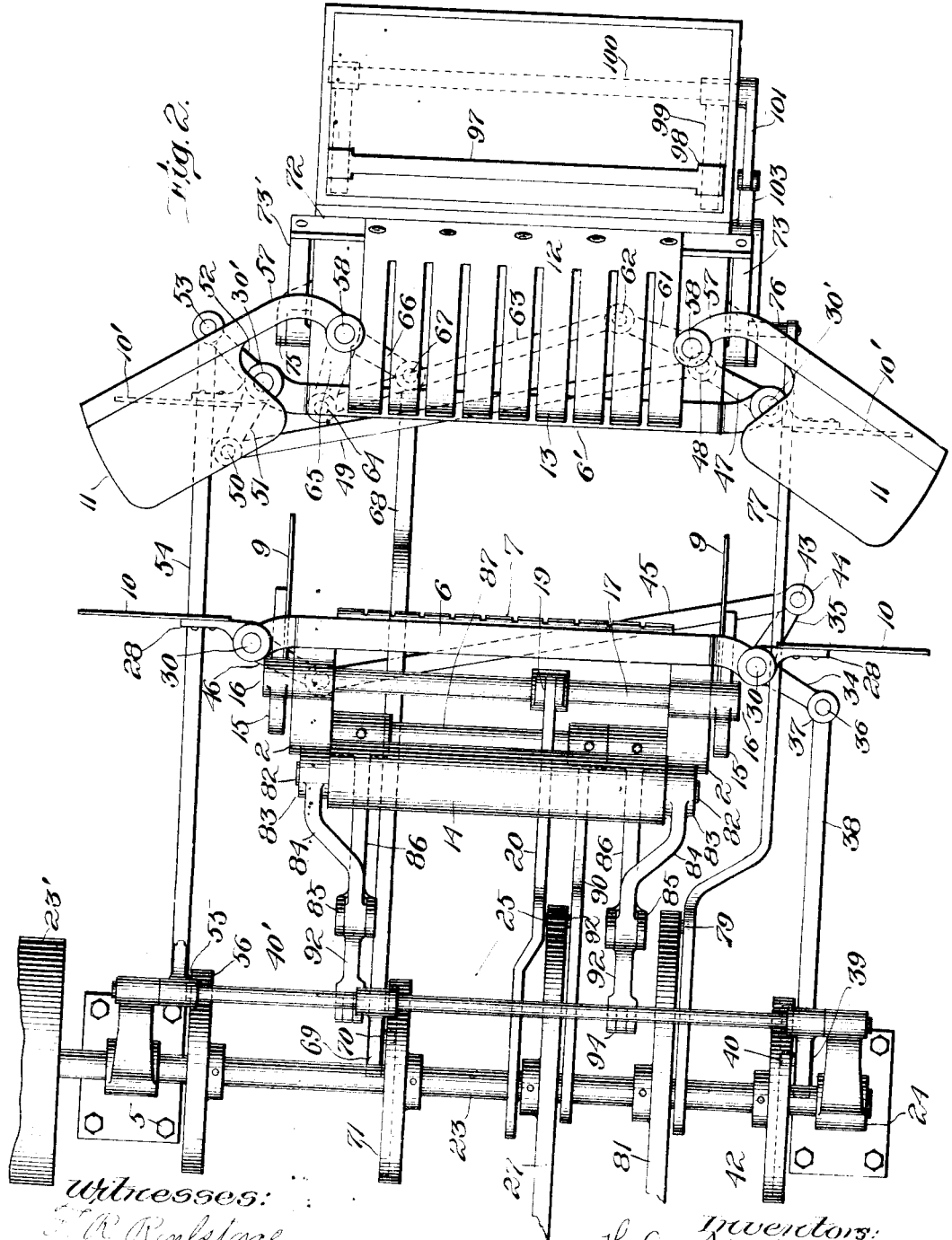

T. B. DOOLEY & H. A. SÉVIGNÉ.
BREAD WRAPPING MACHINE.
APPLICATION FILED SEPT. 11, 1908.
1,064,964.
Patented June 17, 1913.
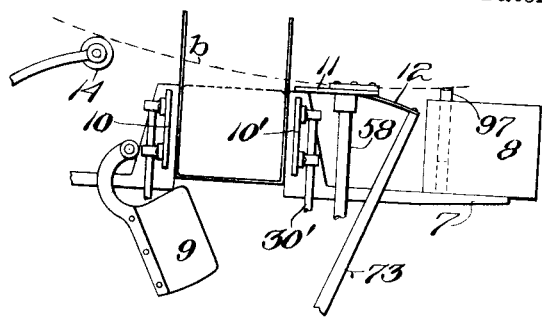
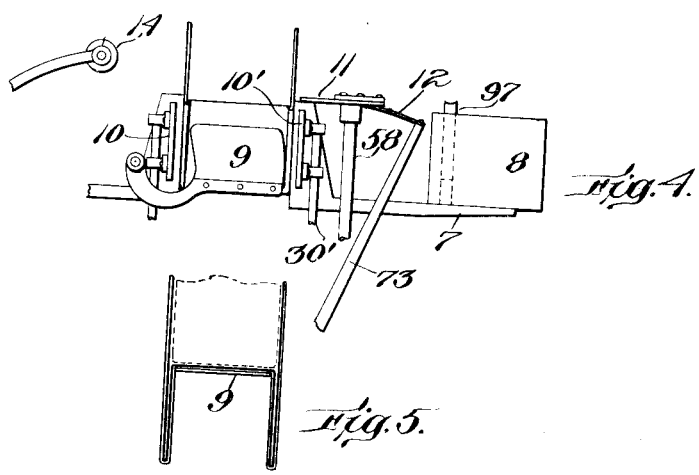
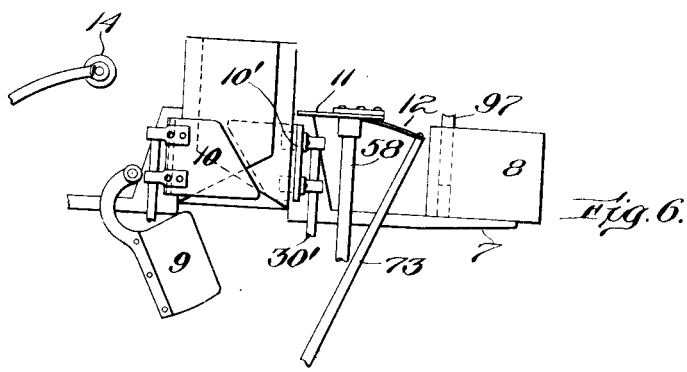

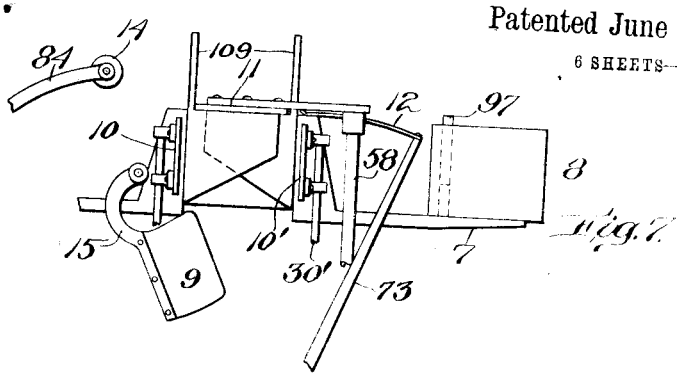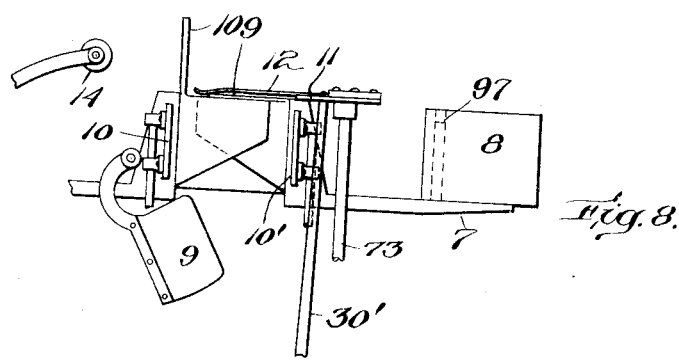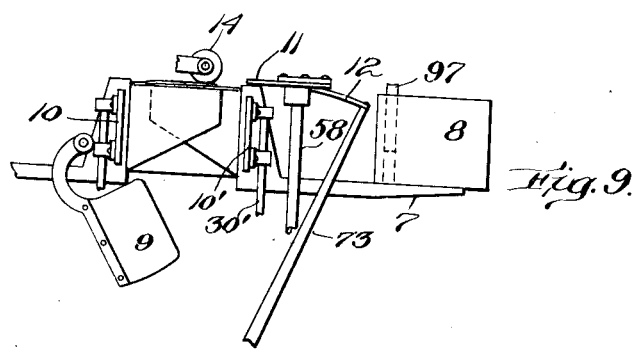

T. B. DOOLEY & H. A. SÉVIGNÉ.
BREAD WRAPPING MACHINE.
APPLICATION FILED SEPT. 11, 1908.
1,064,964.
Patented June 17, 1913.
6 SHEETS—SHEET 5.
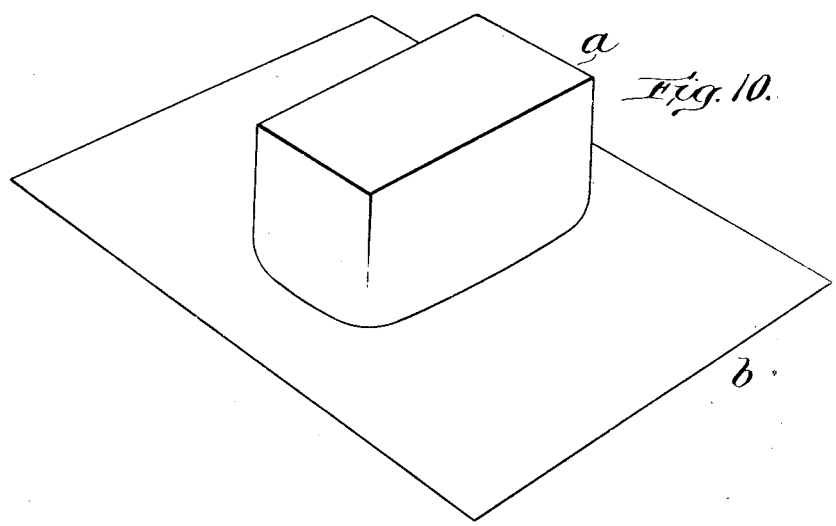
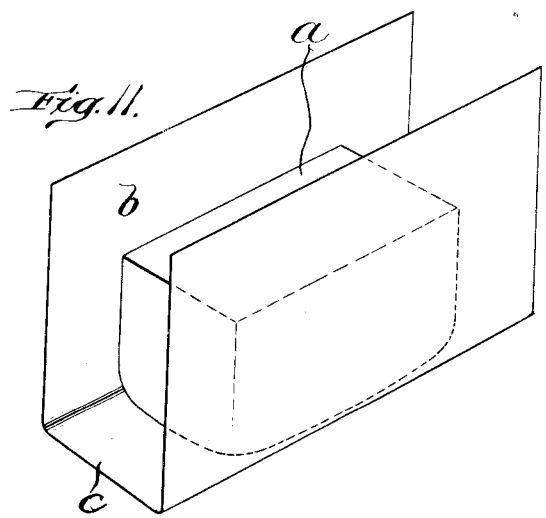

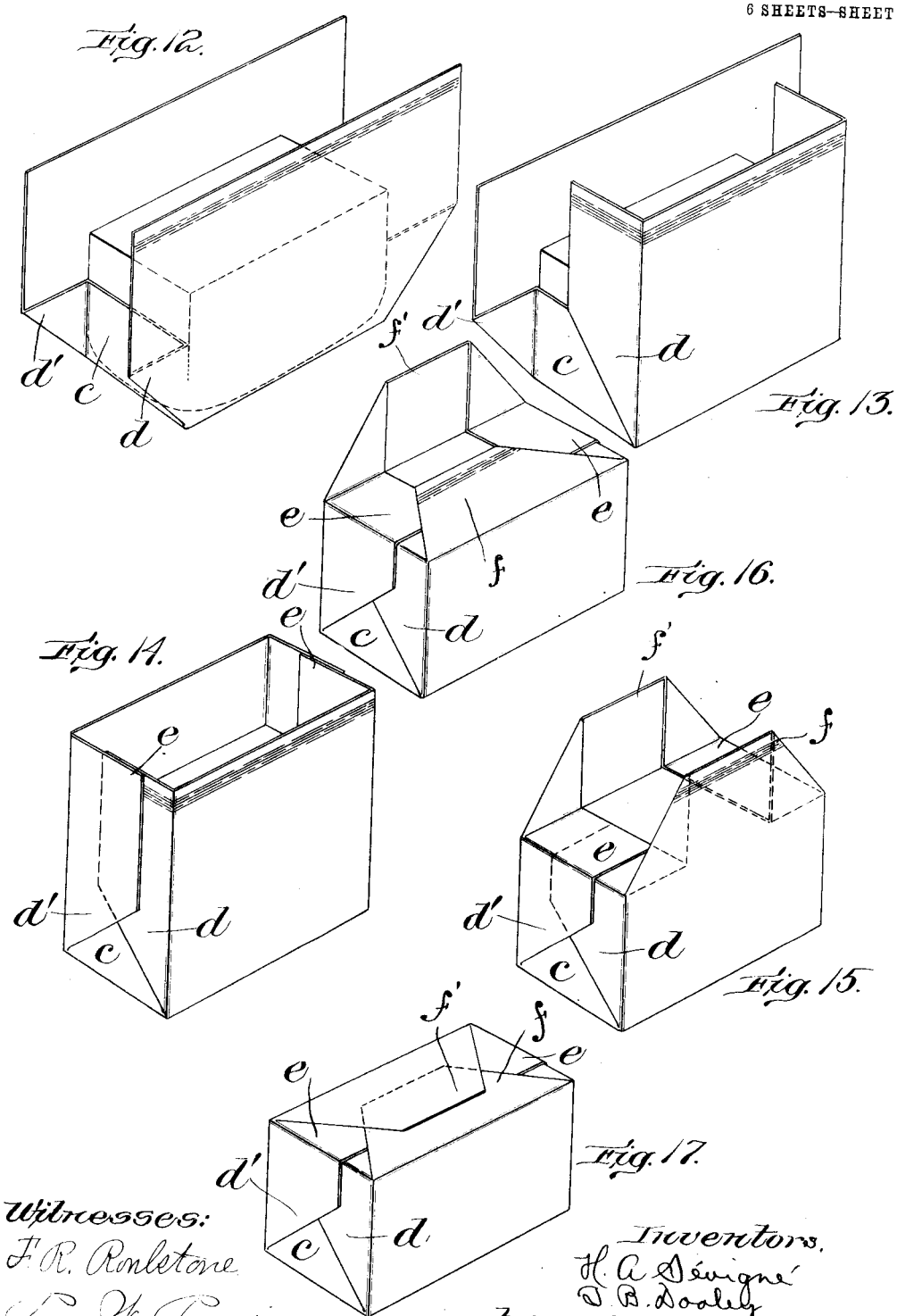

UNITED STATES PATENT OFFICE.

THOMAS B. DOOLEY AND HENRI A. SÉVIGNÉ, OF BOSTON, MASSACHUSETTS; SAID DOOLEY ASSIGNOR TO B. A. BALL, OF BOSTON, MASSACHUSETTS.

BREAD-WRAPPING MACHINE.

1,064,964.  Specification of Letters Patent.  Patented June 17, 1913.

Application filed September 11, 1908. Serial No. 452,651.

*To all whom it may concern:*

Be it known that we, THOMAS B. DOOLEY and HENRI A. SÉVIGNÉ, both of Boston, in the county of Suffolk and State of Massachusetts, have invented certain new and useful Improvements in Bread-Wrapping Machines, of which the following is a specification.

This invention relates to an apparatus and method for wrapping articles and has special reference to wrapping loaves of bread.

The invention has for its object to facilitate and expedite the wrapping of articles and to so wrap and secure wrappers about articles that the several folds of the wrapper are retained in place as they are folded, and the entire folded wrapper is retained in place by the final folding of the wrapper whereby it may be finally secured at one point.

In carrying out the invention, suitable folding devices are provided which are operated in timed relation to each other by means of suitable mechanism, said folding devices wrapping up the article by successive folds of the wrapper, which folds are held in place as the wrapping proceeds and the wrapper finally folded and secured at a single point.

In conjunction with the folding devices, there is provided a receptacle in which the article is supported while the wrapper is being folded about it, said receptacle in conjunction with the article, serving to form the first fold of the wrapper about the article. In conjunction with the folders and the receptacle, there is provided a suitable device for applying an adhesive to the wrapper.

Referring to the accompanying drawings, Figure 1 is a side view in elevation illustrating an apparatus for carrying out the invention. Fig. 2 is a plan view thereof.
Fig. 3 is a detail side view in elevation of a portion of the apparatus adjacent to the receptacle, showing the article and wrapper placed in position in said receptacle. Fig. 4 is a detail side view in elevation showing the position of the folders in the second step of folding the wrapper about the article. Fig. 5 is a plan view of the article and wrapper in the position shown in Fig. 4. Fig. 6 is a detail side view in elevation showing the third step in which the wrapper is folded with overlapping folds at the ends of the article. Fig. 7 is a detail side view in elevation showing the fourth step in which the folded wrapper is folded over
one side adjacent to the ends. Fig. 8 is a detail side view in elevation showing the fifth step in which one of the side vertical projections of the wrapper is folded over the top of the article. Fig. 9 is a detail side view in elevation showing the sixth or last step in which the final projecting vertical side of the wrapper is folded over on top of the article and the wrapper secured by means of an adhesive. Fig. 10 is a perspective view of a wrapper and an article to be wrapped placed thereon. Fig. 11 is a perspective view of the article and the wrapper folded against three sides thereof showing the first step of folding the wrapper. Figs. 12 to 17 inclusive are views in perspective of an article and wrapper, showing the several steps of folding the wrapper about the article, Fig 17 showing the wrapper completely folded about an article.

In carrying out the invention, a folder is located at each end of the receptacle, said folders acting simultaneously to form a single fold of the wrapper against each end of the article, and double vertical folds projecting from each end of the article. At each end of the receptacle is located a pair of folders which act after the fold just described is made to fold in succession each of said double vertical folds in overlapping position against the end folds of the wrapper. The folds of the wrapper projecting above the ends of the article are then folded over the top of the article at its ends by a horizontally movable folder at each end of the receptacle at its top, said folders acting simultaneously. A folder movable across the top of the receptacle is then actuated to fold a remaining portion of the wrapper projecting above one side of the article down onto the top of the article. The end folders having been withdrawn from the ends of the article, a folder on the opposite side of the receptacle advances as the folder movable across the top of the receptacle recedes to fold the remaining portion of the wrapper projecting above that side of the receptacle down onto the top of the article to overlap that portion of the wrapper already folded down onto the top of the article.

Any suitable mechanism may be employed to operate the several folders referred to in successive timed movements relative to each other, and as herein shown and described, a cam lever mechanism is conventionally employed to illustrate such movements.

The machine or apparatus is mounted on a suitable frame, as here shown, consisting of pairs of uprights 1, 2 and 3, projecting upward from suitable base plates 4 secured to any suitable foundation by means of bolts 5. A suitable receptacle for the article to be wrapped is provided and is here shown as consisting of a pair of opposite transverse plates 6 and 6' forming two vertical sides of the receptacle and provided with suitable means for supporting an article between them while it is being wrapped. As here shown, a spring plate 7 is provided, mounted on the side plate 6 and extending from top to bottom and end to end of said plate. The spring plate 7 which is preferably of the bowed form shown, is secured by screws or any other suitable means at its upper edge to the side plate 6, so as to present a yielding surface to an article inserted between it and the side plate 6'. By means of the spring plate 7, articles of different shapes and sizes may be inserted between the spring plate 7 and the side plate 6' and held and supported in place by said spring plate 7 and said side plate 6'. The dotted lines $a$ indicate an article, such as a loaf of bread, held in position between the spring plate 7 and the side plate 6'.

Referring to Fig. 3, the unfolded wrapper $b$ is shown in dotted lines in position to be pushed into the receptacle with the article to be wrapped, and also in position to receive an adhesive substance as hereinafter set forth. Referring to Fig. 3, the article to be wrapped such as a loaf of bread, is pushed down against the wrapper $b$ into the receptacle, thereby folding the wrapper about three sides of the article with the remaining portions of the wrapper projecting above the article and beyond its ends. In this position the wrapper is first folded at the ends of the article. To accomplish this, the folders 9 are provided, which, as here shown, are preferably in the form of broad blades arranged in pairs and each provided with an arm 15 pivoted at 16 to the upper portion of the upright 2, and adapted to swing in a vertical plane across the ends of the receptacle supporting the article. The folders 9 are operated by means of a lever arm 18 projecting from the pivotal point of the arm 15 and pivoted in turn at its outer end at 19 to a lever arm 20 provided at its rear end with an elongated slot 22 which is adapted to engage and reciprocate over the driving shaft 23 mounted at its ends in suitable bearings 24 in the uprights 3, and having at one end a driving wheel or pulley 23' which may be connected by a belt with any suitable source of power. The lever 20 is connected with a cam wheel 27 by means of a pin 25 projecting into a cam groove 26 in the cam wheel 27 mounted on the shaft 23, the cam groove 26 being so shaped that in the rotation of the wheel 27, the folders 9 will be operated through the intervening lever mechanism in timed relation to the several folding steps during the successive operation of the other folders, hereinafter described.

The simultaneous elevating of the folders 9 over the ends of the receptacle when the article with a partly folded wrapper is located therein, serve to fold up a portion of the wrapper extending endwise from the article against the article to be wrapped as shown in Fig. 4. This folding of a portion of the wrapper acts also to form on either side of the ends of the folder 9 diagonal folds of the sides and ends of the wrapper, and to fold these diagonal short folds in overlapping position against the ends of the article partly wrapped, the folders 10 and 10' are employed. The folders 10 and 10' which are in pairs on opposite sides of the machine and consist preferably of flat plates, are vertically mounted on arms 28 connected by sleeves 29 to vertical rotary shafts 30 30' having their upper ends mounted in bearings 31 projecting from the upper ends of the uprights 1 and 2 and mounted at their lower ends in the base plates 4. The lower end of the shaft 30 is provided with a collar 32 connected by means of a lever 34 at its outer end by a pivot pin 36 with a sleeve 37 on the outer end of a lever arm 38 connected at its lower end to a vertically vibrating lever arm 39 pivoted or hinged at its upper end to the shaft 40' having its bearings in the uprights 3.

The vibrating lever 39 is provided with a pin 40 which engages the cam groove 41 in the cam wheel 42 mounted on the shaft 23. The shape of the cam groove 41 is such that the movement communicated to the folders 10, 10' through the levers connecting the cam wheel 42 with said folders, will be in timed relation to the movement of the folders 9. The folders 10, 10', which move simultaneously, are operated by means of the cam wheel 42 and the lever mechanism heretofore described connecting the cam wheel 42 with the shaft 30, and by means of a lever mechanism connecting the shafts 30 on opposite sides of the machine. This lever mechanism consists of a lever arm 35 projecting from the collar 32 and pivotally connected by a sleeve 44 with a lever arm 45 extending across the machine and pivotally connected at its outer end by means of a lever arm 46 with the shaft 30 on the opposite side of the machine. The collar 32' at the lower end of the shaft 30' is provided with a lever arm 47 which is pivotally connected at its outer end at 48 with a lever arm 49 extending across the machine and pivotally connected at its outer end at 50 with a short lever arm 51 which is mounted at its opposite end on the shaft 30' on the opposite side of the machine. Projecting from the said shaft 30' is a short lever 52 which is pivotally connected at its outer end at 53 to a lever 54 extending lengthwise of the machine and hinged at its outer end to the lower end of a vertically vibrating lever 54' hinged at its upper end to the shaft 40'. The vibrating lever 54' is provided with a pin 55 which engages a cam groove in the cam wheel 56. The shape of the cam groove in wheel 56 is such that the movement communicated to the folders 10', 10' through the levers connecting the cam wheel 56 with the folders 10', 10' will be in timed relation to the movement of the folders 10, 10, and will cause the folders 10', 10' to be simultaneously operated successively to the movements of the folders 10, 10. It will be seen that by means of these connections, the two pairs of vertical folders 10 and 10' will be swung toward the ends of the article supported in the receptacle to successively fold the folded projecting flaps shown in Fig. 5, against the ends of the article in the position shown in Fig. 4. During this folding of the projecting end folds, the folders 9 withdraw leaving the folds held by the folders 10 and 10'. During the further folding of the article, the folders 10 and 10' are withdrawn from the ends of the article while the folders 11 and 11' operate to fold the vertically projecting end flaps over the top of the article as shown in Fig. 7. The folders 11 of which there is one on each side of the machine as shown in Fig. 2, are each mounted on an arm 57 mounted on a vertical rotary shaft 58 having a bearing in a collar 59 supported on a shelf 7' of the upright 1, and also having its bearings in brackets 60 projecting from the upright 1. The folders 11, which are so located as to swing horizontally over the top of the ends of the article supported in the receptacle, consist preferably of broad flat blades. The folders or blades 11 are simultaneously operated by means of a lever arm 61 projecting from the shaft 58 and pivotally connected at its outer end at 62 to a lever arm 63 extending across the machine, and pivotally connected at its outer end at 64 to a lever arm 65 projecting from the rotary shaft 58 at the opposite side of the machine.

Projecting from the shaft 58 is a lever arm 66 pivoted at its outer end at 67 to a lever 68 extending longitudinally of the machine and connected at its outer end to the lower end of a vibrating or swinging lever arm 69 hinged or pivoted at its upper end to the shaft 40', and having a pivot pin 70 engaging a cam groove in the cam wheel 71 mounted on the shaft 23. The groove in the cam wheel 71 is of such a shape as to transmit from the wheel 71 through said lever mechanism described, to the folders 11 a timed movement to said folders 11 in relation to the movements of the other folders. The folders 11, being swung in simultaneously by said mechanism above the article to be wrapped, fold the upwardly projecting folding portions of the wrapper at the ends of the article down upon the article as shown in Fig. 7.

In the next step of folding the wrapper, the folder 12 is employed which may be either a solid blade or a blade formed with teeth 13 as here shown to make it elastic, the said folder 12 being mounted on a transverse bar 72 mounted at its ends on arms 73, 73' hinged at their lower ends at 74 to brackets 75 projecting from the uprights 1. The folder 12 is operated by means of a lever 77 pivoted at 76 to the arm 73, said lever 77 extending lengthwise of the machine and being provided at its rear end with an elongated slot 78 which engages and is adapted to slide on the shaft 23, the lever 77 having a pin 79 projecting into a groove 80 in the cam wheel 81 mounted on the shaft 23. The shape of the cam groove 80 is such that in the movement of the wheel 81, a timed movement will be conveyed through the lever mechanism to the folder 12 to operate it at a suitable time after the ends of the wrapper are folded against the article.

In Fig. 8 the folder 12 is shown as having folded down one of the side portions of the wrapper projecting above the article. As the folder 12 is drawn back over the top of the article, the folder 14 preferably in the shape of a roller, is moved over the top of the article, following the folder 12 and folds down the remaining upwardly projecting portion of the wrapper to overlap the other top fold of the wrapper. The ends of the roller 14 are provided with axial projections 82 which are supported in suitable sleeves or trunnions 83 on the ends of arms 84 mounted in sockets 85 in arms 86 pivotally secured at one end to a shaft 87 mounted in brackets 88 on the uprights 2, the lower end of said arms 86 being pivotally connected at 89 to lever arms 90 provided at their outer ends with an elongated slot 91 engaging and adapted to slide on the shaft 23 and having a pin 92 engaging a cam slot in the cam wheel 27. The shape of the cam in the cam wheel 27 is such as to time the movement of the roller 14 and its lever mechanism in relation to the movement of the folder 12.

In order that the roller 14 may have a yielding bearing on articles of irregular surfaces, the arms 84 each have a projection 92 connected with each arm 86 by means of a rod 93 pivoted at one end at 94 to the end of the projection 92 and adapted to slide in a sleeve 95 mounted in the arm 86. A coil spring 96 mounted on the rod 93 and located between its outer end and the sleeve 95, serves to provide a cushioning effect for the roller 14 in its movements in folding the wrapper. On the shelf 7' on top of the upright 1 is mounted a suitable receptacle 8 for containing a suitable adhesive. Located in said receptacle 8 is a transverse grooved bar 97 having its ends mounted in guides 98 whereby the bar 97 may be raised and lowered, said bar 97 being connected by levers 99 in said receptacle with a shaft 100 projecting at one end through said receptacle and having mounted on its projecting end a lever 101 pivotally connected at its outer end to the upper end of a vertically movable rod 102 which is pivotally connected at its lower end with the arm 103 of a bell crank lever mounted on the upright 1, the other arm 104 of said bell crank lever being pivoted to one end of the lever arm 105, the other end of said arm being pivoted at 106 to the lever 73. This lever connection of the vertically movable bar 97 and the vibrating lever 73 is such that, in the timed movements of the vibrating lever 73, the bar 97 is lowered to have a fresh supply of adhesive accumulated thereon, and is raised to bear against and apply the adhesive to the wrapper before it is pushed into the receptacle with the article to be wrapped.

If desired, a suitable device may be provided which extends beneath the receptacle to sustain the article to be wrapped. Said device may be a tilting shelf projecting beneath the receptacle and hinged to the uprights at one side thereof, and connected by suitable cam lever mechanism with the shaft 23 whereby when the article has been wrapped, the shelf will be tilted and the wrapped article be delivered to a suitable point.

In the final folding of the wrapper by means of the roller 14, the fold of the wrapper with the adhesive, which has been applied to the edge of the wrapper, is located beneath the final fold of the wrapper, and as the roller 14 is moved over the final fold of the wrapper, it serves to fasten the final fold of the wrapper by means of the adhesive.

The method of wrapping articles by means of this invention is as follows:—An article such as a loaf of bread $a$ is placed upon a wrapper $b$, as shown in Fig. 10, the loaf of bread being preferably in inverted position as the tops of loaves of bread are generally of irregular shape, while the bottom is practically smooth which permits of the final folds of the wrapper being smoothly and compactly made. In the next step of folding, the wrapper $b$ is folded lengthwise in a U-shape fold about three sides of the loaf $a$, the wrapper projecting beyond the ends of the article and above its top as shown in Fig. 11. In this position, end portions $c$ of the wrapper are first folded in against the ends of the loaf $a$ which act of folding forms folded tapering projecting portions $d$ $d'$ extending beyond the ends of the article as shown in Fig. 12. One of said folded tapering projecting portions $d$ is then folded at each end of the loaf $a$ against the folded end portions $c$ of the wrapper at the ends of the loaf as shown in Fig. 13. The other tapering folded end portions $d'$ at the ends of the loaf $a$ are then folded in overlapping position over said tapering folded end portions $d$ as shown in Fig. 14. In this position, the wrapper projects in folded position above the ends of the loaf and the overlapping folded portions are retained in place at the ends of the loaf. The upwardly projecting folded or overlapping portions $e$ at the ends of the article are then folded down over the top of the loaf at opposite ends as shown in Fig. 15. One of the side remaining portions $f$ of the wrapper projecting above the article is then folded over said end top folded portions $e$ as shown in Fig. 16, and the other remaining projecting portion $f'$ at the side of the article is then folded down upon the folded portions of the wrapper on the top of the article as shown in Fig. 17, and secured in place in any suitable manner.

As shown in Figs. 10 and 11, the wrapper $b$ is rectangular. The operation of folding results in all of the corners of the wrapper being turned in underneath so as to be held by other overlying folds. The use of wrappers which are rectangular in form is not only more economical than when specially shaped wrappers are employed, but the successive operation of the folders is such as to cause all end folds to be so tucked inside other portions of the wrapper that said end folds will be held by the final sealed flap.

Loaves of bread, even when from one baking, widely differ from each other in size and shape, this being due to the unequal rising of the loaves above the top of the pan and to the fact that side and end portions frequently overhang the top edges of the pan. The bottoms of the loaves are the only reliably uniform surfaces. Hence it is necessary, for the best results, to so assemble the loaf and the wrapper that the portion which is the top of the loaf will be in contact with the middle portion of the wrapper, as shown in Figs. 10 and 11. After the fold shown in Fig. 11 has been produced, the successively operating folders next bend the end portions $c$ of the wrapper against the ends of the loaf, as shown in Fig. 12, while still leaving the side edges of the wrapper unfolded and projecting beyond the plane of that portion of the loaf which is known as the bottom because it was shaped by the bottom of the pan. The next operation is to turn doubled portions of the wrapper $d$, $d'$ toward each other and overlap them against the ends of the loaf, as shown in Figs. 13 and 14. The next operating folders cause the end portions $e$ and the side edges $f$, $f'$ to be overlapped upon each other and against the bottom of the loaf, the final flap $f'$ extending in the same direction as the end flaps $d'$. The flaps or folded portions $d$, $d'$ will snugly bear against the ends of the loaf even when the latter are quite irregular, and owing to portions of said flaps $d$, $d'$, as shown in Fig. 15, being turned in against the bottom of the loaf so that they will be held by the sealing of the final flap $f'$, said end portions or folds are securely held without requiring separate treatment by an adhesive.

We claim:

1. A machine for wrapping articles, comprising a receptacle having two confronting sides but otherwise open, a folder at each end thereof movable in a vertical plane so as to cover the end of the receptacle, pairs of folders at each end of the receptacle movable against the ends of the receptacle, a folder at each end of the receptacle at its top movable in a horizontal plane over the top of the receptacle at its ends, a folder movable above the top of the receptacle from one side, and a folder movable above the top of the receptacle from the other side.

2. A machine for wrapping articles, comprising a receptacle having confronting side walls but open at its bottom and ends, swinging folders, one at each end of the receptacle, said folders being arranged to swing edgewise in vertical planes so as to fold portions of the wrapper into the ends of the receptacle, pairs of swinging folders at the ends of the receptacle, each pair movable successively horizontally to fold portions of the wrapper into the ends of the receptacle after the movement of the vertically movable folders, a swinging folder at each end of the receptacle movable simultaneously over the top of the receptacle adjacent to its ends after the movement of the horizontally movable end folders, folders successively movable over the top of the receptacle to finally fold the wrapper, and mechanism which successively operates said several folders in timed relation to each other.

3. A bread wrapping machine having means for folding a rectangular wrapper across the top of the loaf and against the two sides thereof, and a series of successively operating folders for bending end portions of the wrapper against the ends of the loaf, leaving the side edges of the wrapper un-folded, then turning doubled portions of the wrapper toward each other and overlapping them against the ends of the loaf, and then overlapping the side edges of the wrapper and the edges of the previously folded end portions upon each other against the bottom of the loaf.

4. A bread wrapping machine having means for folding a rectangular wrapper across the top of the loaf and against the two sides thereof, and a series of successively operating folders for bending end portions of the wrapper against the ends of the loaf, leaving the side edges of the wrapper un-folded, then turning doubled portions of the wrapper toward each other and overlapping them against the ends of the loaf, then tucking the last mentioned portions toward each other across the bottom of the loaf, and then successively folding the side edges of the wrapper and overlapping them against the bottom of the loaf and upon the previously in-turned end folds.

5. A bread wrapping machine having means for folding a rectangular wrapper across the top of the loaf and against the two sides thereof, and a series of successively operating folders for bending end portions of the wrapper against the ends of the loaf, leaving the side edges of the wrapper un-folded, then turning doubled portions of the wrapper toward each other and overlapping them against the ends of the loaf, then tucking the last mentioned portions toward each other across the bottom of the loaf, and then successively folding the side edges of the wrapper and overlapping them against the bottom of the loaf and upon the previously in-turned end folds, means being provided for applying an adhesive to that portion of the wrapper which constitutes the final fold.

In testimony whereof we have affixed our signatures, in presence of two witnesses.

THOMAS B. DOOLEY.
HENRI A. SÉVIGNÉ.

Witnesses:
EDWARD W. CADY,
PETER W. PEZZETTI.